(12) United States Patent
Welty et al.

(10) Patent No.: US 7,216,661 B2
(45) Date of Patent: May 15, 2007

(54) METHOD OF FORMING A WEAR RESISTANT COMPONENT

(75) Inventors: Richard P. Welty, Boulder, CO (US); Klaus Brondum, Longmont, CO (US); Douglas S. Richmond, Zionsville, IN (US); Patrick B. Jonte, Zionsville, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 11/201,395

(22) Filed: Aug. 10, 2005

(65) Prior Publication Data

US 2006/0038156 A1    Feb. 23, 2006

Related U.S. Application Data

(63) Continuation of application No. 10/741,848, filed on Dec. 18, 2003, now Pat. No. 6,935,618, which is a continuation of application No. 10/322,871, filed on Dec. 18, 2002, now Pat. No. 6,904,935.

(51) Int. Cl.
*F16K 11/00* (2006.01)
*F16K 25/00* (2006.01)

(52) U.S. Cl. ............ 137/15.21; 137/625.17; 137/625.41; 251/368; 428/408; 428/698; 428/701

(58) Field of Classification Search .......... 251/368; 137/625.17, 625.41; 428/408, 698, 701
See application file for complete search history.

(56) References Cited

U.S. PATENT DOCUMENTS

| | | | |
|---|---|---|---|
| 2,020,286 A | 11/1935 | Bittle | |
| 2,411,867 A | 12/1946 | Brenner | |
| 2,639,116 A | 5/1953 | Green | |
| 2,793,282 A | 5/1957 | Steigerwald | |
| 2,861,166 A | 11/1958 | Cargill, Jr. | |
| 2,947,610 A | 8/1960 | Hall et al. | |
| 2,968,723 A | 1/1961 | Steigerwald | |
| 3,141,746 A | 7/1964 | De Lai | |
| 3,207,582 A | 9/1965 | Inoue | |
| 3,346,458 A | 10/1967 | Schmidt | |
| 3,384,119 A | 5/1968 | Manoogian | |
| 3,607,061 A | 9/1971 | Angus | |
| 3,615,208 A | 10/1971 | Byron | |
| 3,630,677 A | 12/1971 | Angus | |
| 3,630,678 A | 12/1971 | Gardner | |

(Continued)

FOREIGN PATENT DOCUMENTS

DE    3728946 A1    3/1989

(Continued)

OTHER PUBLICATIONS

International Search Report for PCT/US03/040681, date of mailing Feb. 22, 2005, 1 page.

(Continued)

*Primary Examiner*—A. Michael Chambers
(74) *Attorney, Agent, or Firm*—Foley & Lardner LLP

(57) ABSTRACT

A method of forming a wear resistant component includes providing a base material, depositing a strengthening layer on the base material, and vapor depositing an amorphous diamond layer on the strengthening layer.

54 Claims, 2 Drawing Sheets

U.S. PATENT DOCUMENTS

| | | |
|---|---|---|
| 3,630,679 A | 12/1971 | Angus |
| 3,667,503 A | 6/1972 | Farrell et al. |
| 3,702,573 A | 11/1972 | Nemeth |
| 3,714,332 A | 1/1973 | Rasquin et al. |
| 3,747,638 A | 7/1973 | Manoogian et al. |
| 3,766,914 A | 10/1973 | Jacobs |
| 3,794,026 A | 2/1974 | Jacobs |
| 3,813,296 A | 5/1974 | McStrack et al. |
| 3,840,451 A | 10/1974 | Golyanov et al. |
| 3,854,493 A | 12/1974 | Farrell |
| 3,879,175 A | 4/1975 | Levitt |
| 3,912,500 A | 10/1975 | Vereschagin et al. |
| 3,913,280 A | 10/1975 | Hall |
| 3,916,506 A | 11/1975 | Wolf |
| 3,929,432 A | 12/1975 | Caveney |
| 3,941,903 A | 3/1976 | Tucker, Jr. |
| 3,953,178 A | 4/1976 | Engel |
| 3,959,557 A | 5/1976 | Berry |
| 3,965,935 A | 6/1976 | Morisseau |
| 4,006,540 A | 2/1977 | Lemelson |
| 4,029,368 A | 6/1977 | Tschirky et al. |
| 4,054,426 A | 10/1977 | White |
| 4,084,942 A | 4/1978 | Villalobos |
| 4,104,441 A | 8/1978 | Fedoseev et al. |
| 4,115,156 A | 9/1978 | Straumann |
| 4,173,522 A | 11/1979 | Pulker et al. |
| 4,190,301 A | 2/1980 | Lachonius et al. |
| 4,228,142 A | 10/1980 | Holcombe, Jr. et al. |
| 4,241,135 A | 12/1980 | Lee et al. |
| 4,260,203 A | 4/1981 | Garner |
| 4,325,403 A | 4/1982 | Uhlmann |
| 4,327,758 A | 5/1982 | Uhlmann |
| 4,345,798 A | 8/1982 | Cortes |
| 4,367,130 A | 1/1983 | Lemelson |
| 4,378,029 A | 3/1983 | Parkison |
| 4,385,880 A | 5/1983 | Lemelson |
| 4,394,400 A | 7/1983 | Green et al. |
| 4,410,054 A | 10/1983 | Nagel et al. |
| 4,434,188 A | 2/1984 | Kamo et al. |
| 4,468,138 A | 8/1984 | Nagel |
| 4,490,229 A | 12/1984 | Mirtich et al. |
| 4,504,519 A | 3/1985 | Zelez |
| 4,524,106 A | 6/1985 | Flasck |
| 4,532,149 A | 7/1985 | McHargue |
| 4,540,636 A | 9/1985 | Mac Iver et al. |
| 4,554,208 A | 11/1985 | Mac Iver et al. |
| RE32,106 E | 4/1986 | Lemelson |
| 4,594,294 A | 6/1986 | Eichen et al. |
| 4,597,844 A | 7/1986 | Hiraki et al. |
| 4,610,577 A | 9/1986 | Spensberger |
| 4,618,505 A | 10/1986 | Mac Iver et al. |
| 4,620,601 A | 11/1986 | Nagel |
| 4,621,031 A | 11/1986 | Scruggs |
| 4,661,213 A | 4/1987 | Dorsett et al. |
| 4,663,183 A | 5/1987 | Ovshinsky et al. |
| 4,666,318 A | 5/1987 | Harrison |
| 4,698,256 A | 10/1987 | Giglia et al. |
| 4,702,808 A | 10/1987 | Lemelson |
| 4,707,384 A | 11/1987 | Schachner et al. |
| 4,708,496 A | 11/1987 | McPherson |
| 4,708,888 A | 11/1987 | Mitchell et al. |
| 4,714,660 A | 12/1987 | Gates, Jr. |
| 4,720,199 A | 1/1988 | Geczy et al. |
| 4,720,349 A | 1/1988 | Kobayashi et al. |
| 4,725,345 A | 2/1988 | Sakamoto et al. |
| 4,729,440 A | 3/1988 | Hall |
| 4,732,364 A | 3/1988 | Seger et al. |
| 4,732,491 A | 3/1988 | Geczy |
| 4,734,339 A | 3/1988 | Schachner et al. |
| 4,755,237 A | 7/1988 | Lemelson |
| 4,756,631 A | 7/1988 | Jones |
| 4,761,217 A | 8/1988 | Dorsett et al. |
| 4,764,036 A | 8/1988 | McPherson |
| 4,764,434 A | 8/1988 | Aronsson et al. |
| 4,767,608 A | 8/1988 | Matsumoto et al. |
| 4,776,862 A | 10/1988 | Wiand |
| 4,778,730 A | 10/1988 | Zucker |
| 4,783,368 A | 11/1988 | Yamamoto et al. |
| 4,797,009 A | 1/1989 | Yamazaki |
| 4,816,286 A | 3/1989 | Hirose |
| 4,816,291 A | 3/1989 | Desphandey et al. |
| 4,816,682 A | 3/1989 | Levitt et al. |
| 4,822,355 A | 4/1989 | Bhuvaneshwar |
| 4,824,262 A | 4/1989 | Kamigaito et al. |
| 4,832,993 A | 5/1989 | Coulon |
| 4,837,089 A | 6/1989 | Araki et al. |
| 4,842,937 A | 6/1989 | Meyer et al. |
| 4,842,945 A | 6/1989 | Ito et al. |
| 4,849,199 A | 7/1989 | Pinneo |
| 4,849,290 A | 7/1989 | Fujimori et al. |
| 4,859,493 A | 8/1989 | Lemelson |
| 4,874,596 A | 10/1989 | Lemelson |
| 4,882,138 A | 11/1989 | Pinneo |
| 4,889,195 A | 12/1989 | Kruger et al. |
| 4,892,420 A | 1/1990 | Kruger |
| 4,900,628 A | 2/1990 | Ikegaya et al. |
| 4,904,542 A | 2/1990 | Mroczkowski |
| 4,935,303 A | 6/1990 | Ikoma et al. |
| 4,940,015 A | 7/1990 | Kobashi et al. |
| 4,960,643 A | 10/1990 | Lemelson |
| 4,961,958 A | 10/1990 | Desphandey et al. |
| 4,966,789 A | 10/1990 | Knapp et al. |
| 4,968,326 A | 11/1990 | Wiand |
| 4,973,494 A | 11/1990 | Yamazaki |
| 4,974,498 A | 12/1990 | Lemelson |
| 4,985,229 A | 1/1991 | Obitsu et al. |
| 4,992,298 A | 2/1991 | Deutchman et al. |
| 4,997,636 A | 3/1991 | Prins |
| 5,006,203 A | 4/1991 | Purdes |
| 5,021,628 A | 6/1991 | Lemelson |
| 5,024,977 A | 6/1991 | Friederich et al. |
| 5,036,733 A | 8/1991 | Tiholiz et al. |
| 5,037,212 A | 8/1991 | Justman et al. |
| 5,040,501 A | 8/1991 | Lemelson |
| 5,055,318 A | 10/1991 | Deutchman et al. |
| 5,067,826 A | 11/1991 | Lemelson |
| 5,068,148 A | 11/1991 | Nakahara et al. |
| 5,070,274 A | 12/1991 | Yoshikawa et al. |
| 5,075,094 A | 12/1991 | Morrish et al. |
| 5,082,359 A | 1/1992 | Kirkpatrick |
| 5,096,352 A | 3/1992 | Lemelson |
| 5,098,737 A | 3/1992 | Collins et al. |
| 5,100,565 A | 3/1992 | Fujiwara et al. |
| 5,104,634 A | 4/1992 | Calcote |
| 5,114,745 A | 5/1992 | Jones |
| 5,124,179 A | 6/1992 | Garg et al. |
| 5,126,274 A | 6/1992 | Mc Iver et al. |
| 5,131,941 A | 7/1992 | Lemelson |
| 5,132,105 A | 7/1992 | Remo |
| 5,132,587 A | 7/1992 | Lemelson |
| 5,135,808 A | 8/1992 | Kimock et al. |
| 5,135,941 A | 8/1992 | Djuric et al. |
| 5,137,398 A | 8/1992 | Omori et al. |
| 5,139,621 A | 8/1992 | Alexander et al. |
| 5,158,695 A | 10/1992 | Yashchenko et al. |
| 5,161,728 A | 11/1992 | Li |
| 5,164,051 A | 11/1992 | Komaki et al. |
| 5,185,179 A | 2/1993 | Yamazaki et al. |
| 5,190,823 A | 3/1993 | Anthony et al. |
| 5,205,188 A | 4/1993 | Repenning et al. |
| 5,224,969 A | 7/1993 | Chen et al. |
| 5,225,366 A | 7/1993 | Yoder |
| 5,232,568 A | 8/1993 | Parent et al. |
| 5,237,967 A | 8/1993 | Willermet et al. |

| | | | | | | |
|---|---|---|---|---|---|---|
| 5,239,746 A | 8/1993 | Goldman | | 5,728,465 A | 3/1998 | Dorfman et al. |
| 5,242,741 A | 9/1993 | Sugiyama et al. | | 5,740,941 A | 4/1998 | Lemelson |
| 5,245,104 A | 9/1993 | Cullick | | 5,747,118 A | 5/1998 | Bunshah et al. |
| 5,246,035 A | 9/1993 | Skyllingstad et al. | | 5,763,072 A | 6/1998 | Kato et al. |
| 5,249,554 A | 10/1993 | Tamor et al. | | 5,763,087 A | 6/1998 | Falabella |
| 5,255,929 A | 10/1993 | Lemelson | | 5,786,038 A | 7/1998 | Conley et al. |
| 5,257,558 A | 11/1993 | Farzin-Nia et al. | | 5,786,068 A | 7/1998 | Dorfman et al. |
| 5,281,274 A | 1/1994 | Yoder | | 5,794,801 A | 8/1998 | Lemelson |
| 5,284,394 A | 2/1994 | Lemelson | | 5,799,549 A | 9/1998 | Decker et al. |
| 5,288,556 A | 2/1994 | Lemelson | | 5,824,367 A | 10/1998 | Park et al. |
| 5,300,942 A | 4/1994 | Dolgoff | | 5,827,613 A | 10/1998 | Nakayama et al. |
| 5,314,652 A | 5/1994 | Simpson et al. | | 5,829,735 A | 11/1998 | Ideda |
| 5,322,735 A | 6/1994 | Fridez et al. | | 5,836,905 A | 11/1998 | Lemelson et al. |
| 5,332,348 A | 7/1994 | Lemelson | | 5,837,394 A | 11/1998 | Schumm, Jr. |
| 5,349,265 A | 9/1994 | Lemelson | | 5,840,132 A | 11/1998 | Erdemir et al. |
| 5,352,493 A | 10/1994 | Dorfman et al. | | 5,849,413 A | 12/1998 | Zhu et al. |
| 5,360,227 A | 11/1994 | Lemelson | | 5,853,839 A | 12/1998 | Schmeisser |
| 5,364,192 A | 11/1994 | Damm et al. | | 5,866,195 A | 2/1999 | Lemelson |
| 5,366,556 A | 11/1994 | Prince et al. | | 5,871,805 A | 2/1999 | Lemelson |
| 5,370,195 A | 12/1994 | Keshavan et al. | | 5,888,638 A | 3/1999 | Kleinhans et al. |
| 5,382,293 A | 1/1995 | Kawarada et al. | | 5,900,982 A | 5/1999 | Dolgoff et al. |
| 5,388,027 A | 2/1995 | Pollock et al. | | 5,902,563 A | 5/1999 | Pinneo |
| 5,391,407 A | 2/1995 | Dearnaley | | 5,927,325 A | 7/1999 | Bensaoula et al. |
| 5,391,409 A | 2/1995 | Shibata et al. | | 5,927,727 A | 7/1999 | Wagner et al. |
| 5,392,982 A | 2/1995 | Li | | 5,934,321 A | 8/1999 | Miya et al. |
| 5,395,221 A | 3/1995 | Tucker, Jr. et al. | | 5,935,323 A | 8/1999 | Tanga et al. |
| 5,401,543 A | 3/1995 | O'Neill et al. | | 5,940,975 A | 8/1999 | Decker et al. |
| 5,403,399 A | 4/1995 | Kurihara et al. | | 5,945,656 A | 8/1999 | Lemelson et al. |
| 5,405,645 A | 4/1995 | Sevillano et al. | | 5,952,102 A | 9/1999 | Cutler |
| 5,411,797 A | 5/1995 | Davanloo et al. | | 5,961,719 A | 10/1999 | Buhaenko et al. |
| 5,415,704 A | 5/1995 | Davidson | | 5,985,451 A | 11/1999 | Senda et al. |
| 5,437,243 A | 8/1995 | Pike-Biegunski | | 6,066,399 A | 5/2000 | Hirano et al. |
| 5,441,013 A | 8/1995 | Jeng et al. | | 6,080,378 A | 6/2000 | Yokota et al. |
| 5,449,569 A | 9/1995 | Schumm, Jr. | | 6,083,570 A | 7/2000 | Lemelson et al. |
| 5,451,307 A | 9/1995 | Bennett et al. | | 6,099,639 A | 8/2000 | Thomas |
| 5,456,406 A | 10/1995 | Lemelson | | 6,099,976 A | 8/2000 | Lemelson et al. |
| 5,462,772 A | 10/1995 | Lemelson | | 6,165,616 A | 12/2000 | Lemelson et al. |
| 5,474,816 A | 12/1995 | Falabella | | 6,186,768 B1 | 2/2001 | Schmitt |
| 5,478,650 A | 12/1995 | Davanloo et al. | | 6,197,438 B1 | 3/2001 | Faulkner |
| 5,529,815 A | 6/1996 | Lemelson | | 6,204,595 B1 | 3/2001 | Falabella |
| 5,533,347 A | 7/1996 | Ott et al. | | 6,207,281 B1 | 3/2001 | Itoh |
| 5,541,003 A | 7/1996 | Nakayama et al. | | 6,207,282 B1 | 3/2001 | Deguchi et al. |
| 5,541,016 A | 7/1996 | Schumm, Jr. | | 6,287,682 B1 | 9/2001 | Grab et al. |
| 5,543,684 A | 8/1996 | Kumar et al. | | 6,299,425 B1 | 10/2001 | Hirano et al. |
| 5,549,764 A | 8/1996 | Biltgen et al. | | 6,314,763 B1 | 11/2001 | Sakamoto |
| 5,551,903 A | 9/1996 | Kumar et al. | | 6,314,764 B1 | 11/2001 | Sakamoto |
| 5,552,675 A | 9/1996 | Lemelson | | 6,342,755 B1 | 1/2002 | Russ et al. |
| 5,554,415 A | 9/1996 | Turchan et al. | | 6,347,905 B1 | 2/2002 | Lukschandel |
| 5,589,232 A | 12/1996 | Simpson | | 6,387,502 B1 | 5/2002 | Okamura et al. |
| 5,593,234 A | 1/1997 | Liston | | 6,406,760 B1 | 6/2002 | Shepard, Jr. |
| 5,601,966 A | 2/1997 | Kumar et al. | | 6,462,467 B1 | 10/2002 | Russ |
| 5,602,679 A | 2/1997 | Dolgoff et al. | | 6,471,408 B1 | 10/2002 | Ikeda et al. |
| 5,609,683 A | 3/1997 | Pike-Biegunski | | 6,478,887 B1 | 11/2002 | Sue et al. |
| 5,616,372 A | 4/1997 | Conley et al. | | | | |
| 5,616,373 A | 4/1997 | Karner et al. | | | | |
| 5,626,963 A | 5/1997 | Hirano et al. | | | | |
| 5,628,881 A | 5/1997 | Lemelson | | | | |
| 5,629,086 A | 5/1997 | Hirano et al. | | | | |
| 5,633,087 A | 5/1997 | Simpson | | | | |
| 5,643,423 A | 7/1997 | Kimock et al. | | | | |
| 5,644,130 A | 7/1997 | Raatz | | | | |
| 5,645,601 A | 7/1997 | Pope et al. | | | | |
| 5,645,900 A | 7/1997 | Ong et al. | | | | |
| 5,648,620 A | 7/1997 | Stenzel et al. | | | | |
| 5,662,965 A | 9/1997 | Deguchi et al. | | | | |
| 5,669,144 A | 9/1997 | Hahn et al. | | | | |
| 5,679,404 A | 10/1997 | Patten, Jr. et al. | | | | |
| 5,688,557 A | 11/1997 | Lemelson et al. | | | | |
| 5,688,677 A | 11/1997 | Ebert et al. | | | | |
| 5,705,271 A | 1/1998 | Okamura et al. | | | | |
| 5,714,202 A | 2/1998 | Lemelson et al. | | | | |
| 5,718,976 A | 2/1998 | Dorfman et al. | | | | |
| 5,725,573 A | 3/1998 | Dearnaley et al. | | | | |

FOREIGN PATENT DOCUMENTS

| | | |
|---|---|---|
| EP | 0 265 533 A1 | 5/1988 |
| EP | 0 361 206 A1 | 4/1990 |
| EP | 0 378 378 A1 | 7/1990 |
| EP | 0 388 861 A2 | 9/1990 |
| EP | 0 388 861 A3 | 9/1990 |
| EP | 0 462 734 A1 | 12/1991 |
| EP | 0 509 630 A2 | 10/1992 |
| EP | 0 509 630 A3 | 10/1992 |
| EP | 0 519 472 A2 | 12/1992 |
| EP | 0 519 472 A3 | 12/1992 |
| EP | 0 519 472 B1 | 12/1992 |
| EP | 0 520 566 A1 | 12/1992 |
| EP | 0 520 566 B1 | 12/1992 |
| EP | 0 520 567 A1 | 12/1992 |
| EP | 0 520 832 B1 | 12/1992 |
| EP | 0 462 734 B1 | 9/1993 |
| EP | 0 603 422 B1 | 6/1994 |

| | | | | | | |
|---|---|---|---|---|---|---|
| EP | 0 605 814 B1 | 7/1994 | | JP | 61-106494 | 5/1986 |
| EP | 0 611 331 B1 | 8/1994 | | JP | 61-124573 | 6/1986 |
| EP | 0 388 861 B1 | 9/1994 | | JP | 62-196371 | 8/1987 |
| EP | 0 632 344 A2 | 1/1995 | | JP | 03-223190 | 10/1991 |
| EP | 0 632 344 A3 | 1/1995 | | JP | 04-165170 | 10/1992 |
| EP | 0 632 344 B1 | 1/1995 | | JP | 62-72921 | 9/1994 |
| EP | 0 676 902 A2 | 10/1995 | | WO | WO 86/06758 A1 | 11/1986 |
| EP | 0 676 902 A3 | 10/1995 | | WO | WO 90/05701 A1 | 5/1990 |
| EP | 0 730 129 A2 | 9/1996 | | WO | WO 92/01314 A1 | 1/1992 |
| EP | 0 730 129 A3 | 9/1996 | | WO | WO 92/15082 A1 | 9/1992 |
| EP | 0 826 798 A2 | 3/1998 | | WO | WO 96/01913 A1 | 1/1996 |
| EP | 0 826 798 A3 | 3/1998 | | | | |
| EP | 0 884 509 A1 | 12/1998 | | | | |
| JP | 57-106513 | 7/1982 | | | | |
| JP | 60-195094 | 10/1985 | | | | |

OTHER PUBLICATIONS

PCT Written Opinion for PCT/US03/040681, no date of mailing referenced, 4 pages.

METHOD OF FORMING A WEAR RESISTANT COMPONENT

CROSS-REFERENCE TO RELATED APPLICATIONS

This application is a continuation of U.S. patent application Ser. No. 10/741,848 filed Dec. 18, 2003 now U.S. Pat. No. 6,935,618, which is a continuation of U.S. patent application Ser. No. 10/322,871, filed Dec. 18, 2002 now U.S. Pat. No. 6,094,935, both of which are incorporated herein by reference in their entirety.

BACKGROUND

This invention relates generally to multi-layer surface coatings for use with articles of manufacture and products requiring low friction, low wear, and protective exterior surfaces. More particularly, the invention is related to articles having mutually sliding components, such as valve components for water mixing valves, having surface protective layers comprising a strengthening layer and an outer amorphous diamond coating.

In certain applications, such as for example, valve plates for fluid control valves, there is a need for mutually sliding surfaces to be wear resistant, abrasion resistant, scratch resistant, and to have a low coefficient of friction. The elements of one type of control valve for mixing of hot and cold water streams typically comprise a stationary disk and a moveable sliding disk, although the plate elements may be of any shape or geometry having a sealing surface, including e.g. flat, spherical, and cylindrical surfaces. The term "disk" herein therefore refers to valve plates of any shape and geometry having mating surfaces which engage and slide against each other to form a fluid-tight seal. The stationary disk typically has a hot water inlet, a cold water inlet, and a mixed water discharge outlet, while the moveable disk contains similar features and a mixing chamber. It is to be understood that the mixing chamber need not be in the disk but could part of an adjacent structure. The moveable disk overlaps the stationary disk and may be slid and/or rotated on the stationary disk so that mixed water at a desired temperature and flowrate is obtained in the mixing chamber by regulating the flowrate and proportions of hot water and cold water admitted from the hot water inlet and the cold water inlet and discharged through the mixed water discharge outlet. The disks mating sealing surfaces should be fabricated with sufficient precision to allow the two sealing surfaces to mate together and form a fluid tight seal (i.e. they must be co-conformal and smooth enough to prevent fluid from passing between the sealing surfaces). The degree of flatness (for a flat plate shape), or co-conformity (for non-flat surfaces) and smoothness required depend somewhat on the valve construction and fluids involved, and are generally well known in the industry. Other types of disk valves, while still using mating sealing surfaces in sliding contact with each other, may control only one fluid stream or may provide mixing by means of a different structure or port configuration. The stationary disk may for example be an integral part of the valve body.

Previous experience with this type of control valve has demonstrated there is a problem of wear of the mating surfaces of the disks due to the fact that the stationary and moveable disks are in contact and slide against each other (see for example U.S. Pat. Nos. 4,935,313 and 4,966,789). In order to minimize the wear problem, these valve disks are usually made of a sintered ceramic such as alumina (aluminum oxide). While alumina disks have good wear resistance, they have undesirable frictional characteristics in that operating force increases, and they tend to become "sticky" after the lubricant grease originally applied to the disks wears and washes away. The scratch and abrasion resistance of alumina plates to large and small particles (respectively) in the water stream is good; however, they are still susceptible to damage from contaminated water streams containing abrasive particles such as sand; and improvement in this regard would be beneficial. Additionally, the porous nature of the sintered ceramic disks makes them prone to "lockup" during long periods of non-use, due to minerals dissolved in the water supply that precipitate and crystallize between coincident pores in the mating surfaces. One objective of the present invention is to provide disks having reduced wear, improved scratch and abrasion resistance and reduced frictional characteristics. Another objective is to provide non-porous or reduced-porosity valve disks to reduce the number of locations where precipitated crystals may form between the mating surfaces.

Sintered ceramics in particular are relatively difficult and expensive (due to their hardness) to grind and polish to a degree of co-conformity and smoothness adequate for sealing. It would be advantageous to use a material for the disks, such as metal, which is less expensive, easier to grind and polish and which is not porous. However, the wear resistance and frictional behavior of bare metallic disks is generally not acceptable for sliding seal applications. A further objective of the present invention is to provide disks made of metal a base material and having improved wear, scratch, and abrasion resistance and improved frictional characteristics as compared to uncoated ceramic disks.

It is disclosed in the prior art (e.g. U.S. Pat. Nos. 4,707,384 and 4,734,339, which are incorporated herein by reference) that polycrystalline diamond coatings deposited by chemical vapor deposition (CVD) at substrate temperatures around 800–1000 C can be used in combination with adhesion layers of various materials in order to provide scratch and wear resistant components. Polycrystalline diamond films, however, are known to have rough surfaces due to the crystal facets of the individual diamond grains, as is apparent in the photographs of FIGS. 2 and 3 in the '384 patent. It is known in the art to polish such surfaces in order to minimize the coefficient of friction in sliding applications, or even to deposit the polycrystalline diamond on a smooth substrate and then remove the film from the substrate and use the smooth side of the film (which was previously against the substrate) rather than the original surface as the bearing surface. The present invention overcomes prior art problems by providing a number of advantageous features, including without limitation providing a smooth and very hard surface for sliding applications, while avoiding difficult and expensive post-processing of a polycrystalline diamond surface layer. The methodology also advantageously employs substrate materials (such as, suitable metals, glasses, and composite and organic materials) that cannot be processed at the elevated temperatures necessary for CVD deposition of polycrystalline diamond.

It is also disclosed in the prior art (e.g. U.S. Pat. No. 6,165,616, which is incorporated herein by reference) that engineered interface layers may be employed to relieve thermally-induced stress in a polycrystalline diamond layer. These thermally induced stresses arise during cooling of the substrate after coating deposition at relatively high temperatures, and are due to the difference in thermal expansion coefficient between the substrate and the diamond coating. Rather complicated engineering calculations are specified in '616 to predetermine the desired interface layer composition and thickness. The interface layer thickness' disclosed in '616 to minimize the thermally-induced stress in the diamond layer are of the order 20 to 25 microns according to FIGS. 1 through 3. Such thick interface layers are expensive to deposit, due to the time necessary to deposit them and the high cost of the equipment required. The present invention also advantageously includes, without limitation, minimizing the coating cost but still achieving desired results by employing much thinner interface layers than those taught by '616, and to avoid creating the thermally-induced stresses which necessitate such complicated engineering calculations by depositing a hard surface layer at a relatively low temperature compared to the prior art, such as the '616 patent.

It is further disclosed in the prior art (e.g. U.S. Pat. Nos. 4,935,313 and 4,966,789, which are incorporated herein by reference) that cubic crystallographic lattice carbon (polycrystalline diamond) and other hard materials may be used as surface coatings on valve disks, and that pairs of mutually sliding valves discs which differ from each other in either surface composition or surface finish are preferable to those which are the same in these characteristics, with respect to minimizing friction between the plates. The present invention provides mating valve disk surfaces having a lower friction coefficient than the disclosed materials in water-lubricated or fluid wetted surface applications such as water valves, and to allow identical processing of both mating surfaces in order to avoid the need to purchase and operate different types of processing equipment. The present invention further provides, without limitation, mating valve disk surfaces having a lower friction coefficient than the disclosed materials in water-lubricated or fluid wetted surface applications such as water valves. Furthermore, both mated sliding surfaces of the disks can be hard and have an abrasion resistance to contaminated water streams and to allow identical processing of both mating surfaces in order to avoid the need to purchase and operate different types of processing equipment.

SUMMARY

An exemplary embodiment relates to a method of forming a wear resistant component that includes providing a base material, depositing a strengthening layer on the base material, and vapor depositing an amorphous diamond layer on the strengthening layer.

Another exemplary embodiment relates to a method of producing a valve plate that includes providing a strengthening layer on a substrate and providing amorphous diamond on the strengthening layer.

DESCRIPTION OF THE PREFERRED EMBODIMENTS

Figure 1:
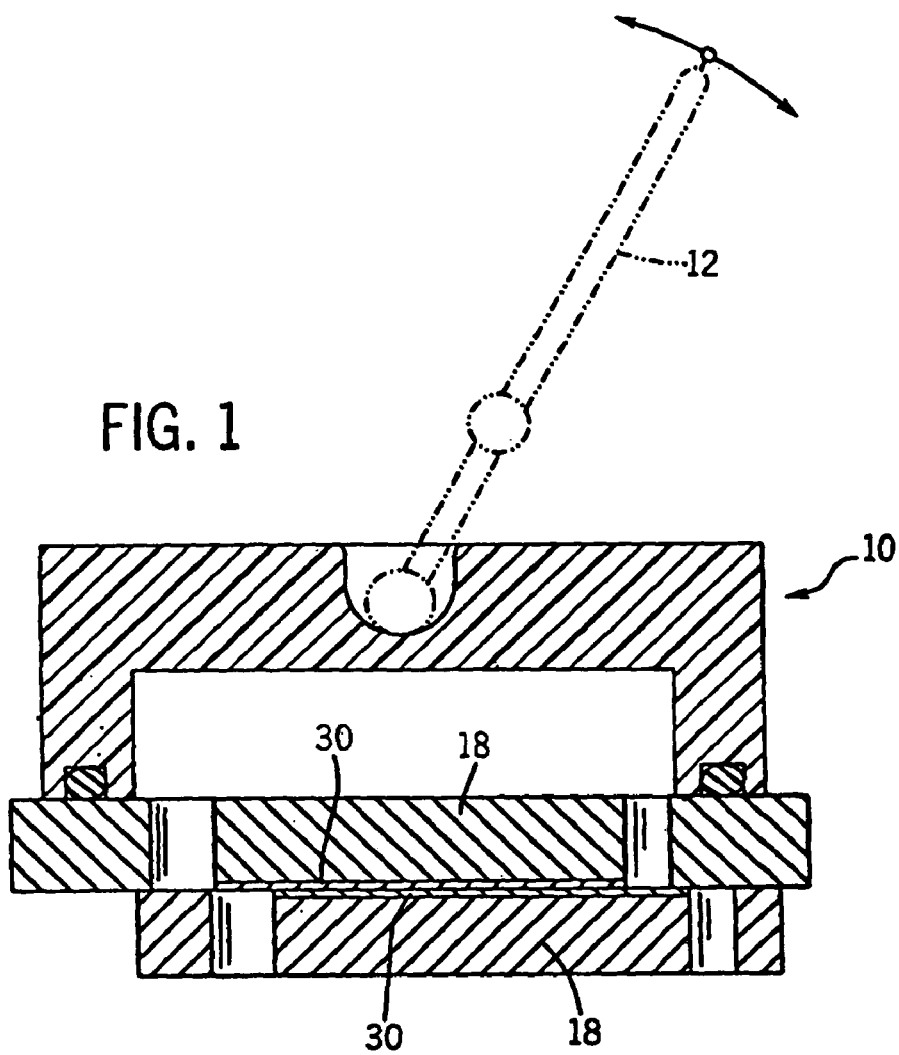
FIG. 1 is one form of valve incorporating a multi-layer structure with an amorphous diamond layer overlying a substrate.
Figure 2:
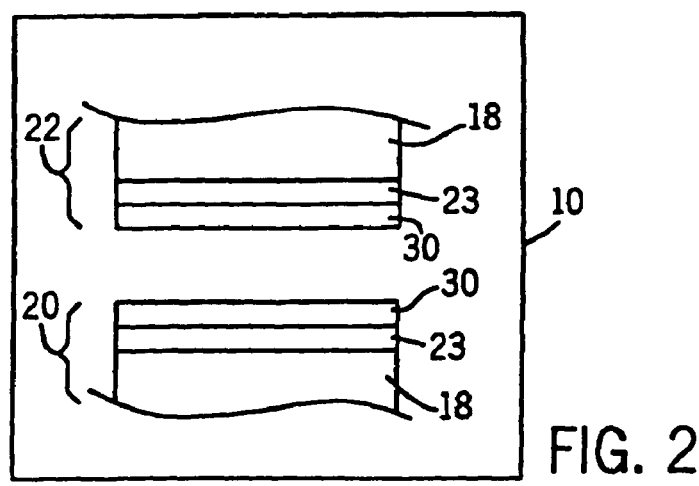
FIG. 2 is a detail of one form of multi-layer structure of the invention.
Figure 3:
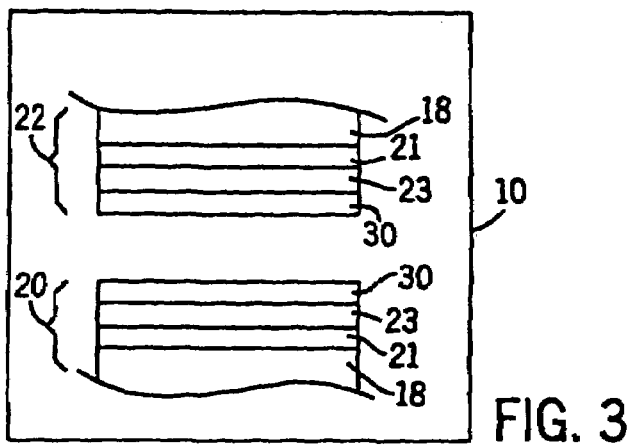
FIG. 3 illustrates yet another multi-layer structure with an added additional adhesion-promoting layer.
Figure 4:
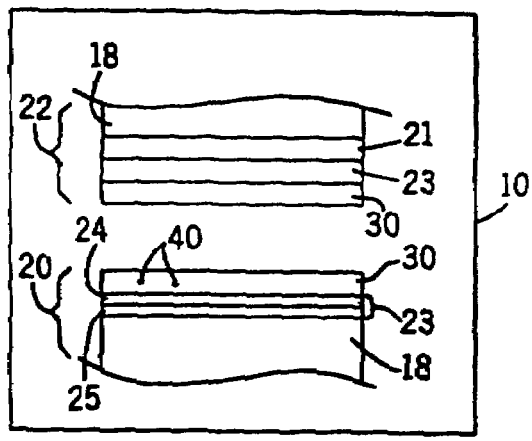
FIG. 4 is a further form of multi-layer structure of FIG. 2 wherein a strengthening layer includes two layers of different materials.

Embodiments of the invention are illustrated generally in the figures, where FIG. 1 shows one form of the valve 10 with handle 12 incorporating the invention. In particular, FIGS. 2–4 illustrate a portion of a valve 10 having a substrate 18 for a sliding component 20 and/or a fixed component 22 of the valve 10 which can comprise a base material wherein the base material can be the same or different in the sliding component 20 and the fixed component 22. In other embodiments, one of the components 20, 22 can be fixed. Preferably the base material is a sintered ceramic or a metal. Base materials can also comprise glasses or glassy materials, cermets, polymeric materials, composite materials, intermetallic compounds such as iron aluminide, and other materials mechanically suitable for the application. The metals can include, for example, any conventional metal, including without limitation, stainless steel, brass, zirconium, titanium, aluminum, and alloys of the latter three materials. Stainless steel, titanium, and zirconium, and aluminum are the most preferred metals, with the term stainless steel referring to any type such as 304, 316, etc., and customized variations thereof and with the terms titanium, zirconium, and aluminum understood to include alloys comprised mostly of those metals. Sintered (powdered) stainless steel is a preferred substrate material because it can be economically molded into complex shapes suitable for disks and can be economically ground and polished to achieve a mating smooth sealing surface. In the case of sintered stainless steel, "fully dense" substrates and metal injection molded substrates are preferred. Titanium and zirconium are preferred base materials because they can be easily oxidized or anodized to form a hard surface layer. Ceramics can be any conventional ceramic material, including without limitation, for example, sintered alumina (aluminum oxide) and silicon carbide, with alumina being a preferred material. Composite materials can include, for example, any conventional cermets, fiber reinforced epoxies and polyamides, and carbon-carbon composites. Glass and glassy materials can include for example borosilicate glass such as Pyrex™, and materials such as toughened laminated glass and glass-ceramics. Glass, glassy materials and cermets are preferred substrates because they can be economically molded into complex shapes suitable for disks and can be economically ground and polished to a flat and smooth surface. Iron aluminide is understood to be a material consisting mainly of that iron and aluminum but may also contain small amounts of such other elements as molybdenum, zirconium, and boron.

As shown in FIG. 2, a strengthening layer 23 can also be placed directly on the substrate surface 18. This layer 23 can comprise a material having higher hardness than the substrate 18. Suitable materials for the strengthening layer 23 can include compounds of Cr, Ti, W, Zr, and any other metals conventionally known for use in hard coatings. The compounds include without limitation are nitrides, carbides, oxides, carbo-nitrides, and other mixed-phase materials incorporating nitrogen, oxygen, and carbon. One highly preferred material for the strengthening layer 23 is chromium nitride. Chromium nitride in the present application most preferably refers to a single or mixed phase compound of chromium and nitrogen having nitrogen content in the range of about 10 to about 50 atomic percent. The term chromium nitride also refers to a material containing such doping or alloying elements as yttrium, scandium, and lanthanum in addition to chromium and nitrogen.

Another material suitable for the strengthening layer 23 is conventional DLC (Diamond-Like Carbon), which is a form of non-crystalline carbon well known in the art and distinct from amorphous diamond. DLC coatings are described for example in U.S. Pat. No. 6,165,616 (in which they are called (a-C) coatings). DLC can be deposited by sputtering or by conventional CVD. DLC is an amorphous material with mostly sp2 carbon bonding and little of the tetrahedral sp3 bonding that characterizes amorphous diamond. The hardness of DLC is substantially lower than that of amorphous diamond and is more similar to the hardness of conventional hard coating materials such as titanium nitride and chromium nitride. The internal stresses in DLC coatings are also lower than those in amorphous diamond coatings, allowing DLC to be deposited in thicker layers than amorphous diamond without loss of adhesion. The term DLC as used herein includes hydrogenated forms of the material.

The strengthening layer 23 functions primarily to improve scratch and abrasion resistance of the multilayer coating. The hardness of the strengthening layer 23 should be at least greater than that of the substrate 18 in order to perform its intended function of improving the scratch resistance of the coated disk. The thickness of the strengthening layer 23 is at least a thickness sufficient to improve the scratch resistance of the substrate 18. For materials typically used as hard coatings, such as those disclosed above, this thickness is generally from around 500 nm to around 10 microns, and preferably from about 2000 nm to around 5000 nm. In testing of faucet water valves it has been found that a chromium nitride strengthening layer having a thickness of about 5 microns provides adequate scratch and abrasion resistance (in conjunction with a thin amorphous diamond top layer) for types and sizes of contaminants considered to be typical in municipal and well water sources.

In some embodiments of the present invention as shown in FIG. 3 and for component 22 of FIG. 4, a thin adhesion-promoting layer 21 can be deposited on the substrate 18 and then the strengthening layer 23 on the layer 21. This layer 21 functions to improve the adhesion of the overlying strengthening layer 23 to the substrate 18. Suitable materials for the adhesion-promoting layer 21 include preferably chromium and also can include titanium, tungsten, other refractory metals, silicon, and other materials known in the art to be suitable as adhesion-promoting layers. The layer 21 can conveniently be made using the same elemental material chosen for the strengthening layer 23. The layer 21 has a thickness that is at least adequate to promote or improve the adhesion of layer 23 to the substrate 18. This thickness is generally from about 5 nm to about 200 nm, and most preferably from about 30 nm to about 60 nm. The adhesion-promoting layer 21 can be deposited by conventional vapor deposition techniques, including preferably physical vapor deposition (PVD) and also can be done by chemical vapor deposition (CVD).

PVD processes are well known and conventional and include cathodic arc evaporation (CAE), sputtering, and other conventional deposition processes. CVD processes can include low pressure chemical vapor deposition (LPCVD), plasma enhanced chemical vapor deposition (PECVD), and thermal decomposition methods. PVD and CVD techniques and equipment are disclosed, inter alia, in J. Vossen and W. Kern "Thin Film Processes II", Academic Press, 1991; R. Boxman et al, "Handbook of Vacuum Arc Science and Technology", Noyes, 1995; and U.S. Pat. Nos. 4,162,954 and 4,591,418, with the patents incorporated herein by reference.

In the case of sintered ceramic materials, although the individual granules forming the sintered material may have high hardness, the scratch resistance of the overall sintered structure as measured by scratch testing is much lower than that of the material forming the granules (e.g. alumina). This is due to the fact that the materials typically used to sinter or bond the alumina granules together, typically silicates, are not as hard as the granules themselves. The hardness of the strengthening layer 23 can be similar to or even less than the hardness of the individual granules comprising the ceramic disk, and still being harder than the overall sintered ceramic structure. It has been found by experiment, for example, that the depth of the scratch caused by a stylus (radius=100 microns) sliding under a load of 30 Newtons is approximately 4–6 microns on an uncoated sintered alumina substrate, while the scratch depth on an identical substrate coated with a 3 micron thick chromium nitride strengthening layer is only 2–3 microns.

The strengthening layer 23 can be formed by conventional vapor deposition techniques including, but not limited to sputtering, cathodic arc evaporation (CAE), and CVD. The most preferred methods are sputtering, CAE, or other means which may be carried out at a relatively low temperature, thereby minimizing thermally-induced stresses in the coating stack upon cooling. If the strengthening layer 23 is deposited by CAE, it is also desirable to use macroparaticle filtering in order to control and to preserve the smoothness of the surface of the substrate 18. The strengthening layer 23 can also be formed by other well-known methods for forming hard coatings such as spray pyrolysis, sol-gel techniques, liquid-dipping with subsequent thermal treatment, nano-fabrication methods, atomic-layer deposition methods, and molecular-layer deposition methods.

The strengthening layer 23 can alternatively be formed by a process that produces a hardened surface layer on the substrate base material. Such processes include, for example, thermal oxidation, plasma nitriding, ion implantation, chemical and electrochemical surface treatments such as chemical conversion coatings, anodizing including hard anodizing and conventional post-treatments, micro-arc oxidation and case hardening. The strengthening layer 23 can also include multiple layers 24 and 25 as shown in FIG. 4, in which the layers 24 and 25 together form the strengthening layer 23. For example, the layer 24 can be an oxide thermally grown on the substrate base material while the layer 25 is a deposited material such as CrN. The strengthening layer 23 can also include more than two layers, and can preferably comprise for example a superlattice type of coating with a large number of very thin alternating layers. Such a multilayer or superlattice form of the strengthening layer 23 can also include one or multiple layers of amorphous diamond.

In the multi-layer structure of FIGS. 1–4 the amorphous diamond layer 30 is deposited over the strengthening layer 23 to form an exterior surface layer. The purpose of the amorphous diamond layer 30 is to provide a very hard wear abrasion resistant and lubricous top surface on the sliding components. Amorphous diamond is a form of non-crystalline carbon that is well known in the art, and is also sometimes referred to as tetrahedrally-bonded amorphous carbon (taC). It can be characterized as having at least 40 percent sp3 carbon bonding; a hardness of at least 45 gigaPascals and an elastic modulus of at least 400 gigaPascals. Amorphous diamond materials are described in U.S. Pat. Nos. 5,799,549 and 5,992,268, both of which are incorporated herein by reference. The amorphous diamond material layer 30 can be applied processes including, for example, conventional filtered cathodic arc evaporation and laser ablation. The term amorphous diamond as used herein includes all forms of taC type carbon and may also contain doping or alloying elements such as nitrogen and metals, and also includes nano-structured materials containing amorphous diamond. Nano-structured materials mean herein materials having structural features on the scale of nanometers or tens of nanometers, including but not limited to superlattices.

Figure 5:
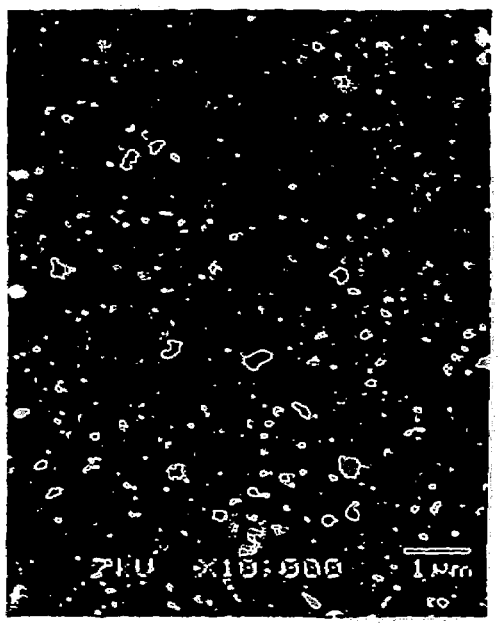
FIG. 5 is a photomicrograph of the surface appearance of an exterior amorphous diamond layer over an underlying substrate or layer.

The thickness of the amorphous diamond layer 30 is at least a value effective to provide improved wear and abrasion resistance of the sliding component. This thickness is generally at least about 100 nm, preferably at least about 200 nm and more preferably at least about 300 nm. The upper thickness range of the layer 30 is determined by material characteristics, economic considerations and the need to minimize thickness-dependent intrinsic stresses in the layer 30 as discussed below. Also amorphous diamond layer 30 advantageously exhibits an extremely smooth surface topology as can be seen by reference to the photo of FIG. 5, principally because there are no individual diamond grains in an amorphous coating. In addition, the surface topography of the thin amorphous diamond layer 30 essentially replicates that of the subsurface upon which it is deposited, and therefore the amorphous diamond layer 30 has substantially the same average surface roughness as that of the subsurface. Graphitic inclusions, visible as light spots in FIG. 5, do not contribute to the surface roughness, as the term is used herein, because they are very soft and are reduced to a lubricative powder when the sliding surfaces are brought into contact. Amorphous diamond has the further advantage that it can be deposited at much lower temperatures (generally below approximately 250 C) than polycrystalline diamond, thus eliminating the need for the thick, engineered interface layers disclosed in the prior art (see, e.g. U.S. Pat. No. 6,165,616) for relieving the thermally-induced stress in the diamond layer. These thermally induced stresses arise during cooling after deposition at the high temperatures characteristic of CVD, and are due to the difference in thermal expansion coefficient between the substrate and the diamond coating. We have found that the type of calculations disclosed in the '616 patent for determining the thickness of its thermally-induced stress relieving interface layer are not necessary for amorphous diamond films due to the low deposition temperature.

One characteristic of amorphous diamond is that it develops high intrinsic (non-thermally-induced) internal stresses, which increase as the coating thickness increases and which are predominately related to atomic bonding distortions and not to thermal expansion/contraction. While this intrinsic stress is believed to contribute to the high hardness of the material, it also limits the coating thickness since stress-induced forces tend to cause delamination of the coating from the substrate 18 (or the strengthening layer 23) above a certain thickness. Although amorphous diamond can be deposited directly on a metal, glass or iron aluminide disk (optionally with an adhesion layer), it is difficult to deposit a thick enough layer to provide adequate scratch resistance for water valve applications. Scratch resistance is important because water supplies sometimes contain abrasive contaminants due to pipeline breaks, construction, etc. The additional strengthening layer 23 of the present invention provides better support of the amorphous diamond layer 30 than does the softer substrate material, advantageously allowing a thinner layer of amorphous diamond to be used, while still obtaining improved scratch and abrasion resistance. The strengthening layer 23 can also be chosen to be a material that has a greater deposition rate and/or is less expensive to deposit than the amorphous diamond layer 30, in order to minimize overall coating cost while maintaining performance. In the most preferred embodiment, an upper thickness limit for the amorphous diamond layer 30 of around 1–2 microns can be used to avoid stress-induced delamination, while an upper thickness of around 800 nm, and more preferably around 300–500 nm, can be desirable for economic reasons while still achieving the desired performances characteristics.

Amorphous diamond is well suited to wet sliding applications in water valve applications. In particular it has been shown to have a very low coefficient of friction and also extremely low abrasion wear in water-lubricated sliding tests in which both sliding surfaces are coated with amorphous diamond. In contrast, DLC coatings are known to have higher friction coefficients higher wear rates, and to deteriorate in frictional performance with increasing humidity. A further advantage of amorphous diamond is that the relatively low deposition temperature allows a wider choice of substrate materials and minimizes or eliminates permanent thermally induced distortion of the substrate.

Regarding the low coefficient of friction reported for amorphous diamond coatings in water-lubricated sliding tests, it is thought that this may be due at least in part to graphitic inclusions (commonly called macroparticles) that are incorporated in amorphous diamond coatings made by some methods. Such graphitic inclusions can be numerous in carbon coatings deposited by cathodic arc evaporation, depending on the choice target materials and use of macroparticle filtering means as discussed below. These graphitic inclusions do not degrade the performance of the amorphous diamond coating due their softness and the small fraction of the total surface area they occupy. Rather, it is thought that they may improve performance by increasing lubricant retention between the sliding plates.

It is disclosed in U.S. Pat. No. 5,401,543 (incorporated herein by reference) that amorphous diamond coatings which are essentially free of macroparticles can be deposited by cathodic arc evaporation from a vitreous carbon or pyrolytic graphite cathode. The maximum density of macroparticles (graphitic inclusions) in such coatings, as calculated from the areal dimensions of the photographic figures and the macroparticle counts disclosed, is around 200 macroparticles per square millimeter. Such macroparticle-free amorphous diamond coatings can be used as layer 30 in the present invention, but are less-preferred than those deposited from an ordinary graphite cathode and containing substantial numbers of graphitic inclusions, such as, for example, at least about 500 per square millimeter. They are also less preferred because the required vitreous carbon or pyrolytic graphite cathodes are quite expensive compared to ordinary graphite.

The number of graphitic inclusions 40 incorporated into coatings (see FIG. 4 showing them schematically) deposited by filtered arc evaporation from an ordinary graphite cathode can be controlled according to the present invention by choosing the filter design and operating parameters so as to allow the desired number of macroparticles to be transmitted through the source. The factors influencing the transmission of macroparticles through a filter are discussed e.g. in U.S. Pat. No. 5,840,163, incorporated herein by reference. Filter designs and operating parameters are conventionally chosen to minimize the number of macroparticles transmitted through the source, however this choice also generally reduces the (desired) output of carbon ions and hence reduces the deposition rate. Contrary to this usual practice, we find that it is preferable for purposes of minimizing coating cost to choose the filter design and operating parameters so as to maximize the carbon ion output of the source (i.e. the deposition rate) without exceeding the maximum tolerable number of graphitic inclusions incorporated into the coating. The maximum tolerable number of inclusions is that number above which the performance of the coated parts deteriorates unacceptably due to the increasing fraction of the surface area occupied by the inclusions. Critical performance factors can include non-leakage of the working fluid, sliding friction coefficient, scratch and abrasion resistance, and wear life. We have found that graphitic inclusion surface densities substantially higher than 500/mm$^2$ are tolerable, and may be beneficial as described above.

The adhesion of the amorphous diamond layer 30 to a nitride form of the strengthening layer 23 can in some cases be improved by the introduction of a carbon-containing gas, such as methane, during a short period at the end of the deposition of the strengthening layer 23. This results in a thin transition zone of carbo-nitride and/or carbide material between the strengthening layer 23 and the amorphous diamond layer 30. In other cases the adhesion can be improved by turning off all reactive gasses during a short period at the end of the deposition of the strengthening layer 23. This results in a thin metal layer between the strengthening layer 23 and the amorphous diamond layer 30. It has also been noted that the introduction of methane during the filtered-arc deposition of the amorphous diamond layer 30 increases the coating deposition rate, and can also improve the coating hardness and scratch resistance. In still other cases, for example the case in which the amorphous diamond layer 30 is to be deposited on a thermally oxidized metal surface, it can be desirable to deposit the separate adhesion-promoting layer 21 between the strengthening layer 23 and the amorphous diamond layer 30. Suitable materials for the adhesion layer 21 can include for example refractory carbide-forming metals, such as, Ti and W, and various transition metals such as Cr, and can also include carbides of those metals.

In order that the invention may be more readily understood the following examples are provided. The examples are illustrative and do not limit the invention to the particular features described.

EXAMPLE 1

Clean stainless steel valve disks are placed in a vacuum deposition chamber incorporating an arc evaporation cathode and a sputtering cathode. The arc source is fitted with filtering means to reduce macroparticle incorporation in the coating, as described for example in U.S. Pat. Nos. 5,480,527 and 5,840,163, incorporated herein by reference. Sources of argon and nitrogen are connected to the chamber through a manifold with adjustable valves for controlling the flowrate of each gas into the chamber. The sputtering cathode is connected to the negative output of a DC power supply. The positive side of the power supply is connected to the chamber wall. The cathode material is chromium. The valve disks are disposed in front of the cathode, and may be rotated or otherwise moved during deposition to ensure uniform coating thickness. The disks are electrically isolated from the chamber and are connected through their mounting rack to the negative output of a power supply so that a bias voltage may be applied to the substrates during coating.

Prior to deposition the vacuum chamber is evacuated to a pressure of 2×10e−5 Torr or less. Argon gas is then introduced at a rate sufficient to maintain a pressure of about 25 milliTorr. The valve disks are then subjected to a glow discharge plasma cleaning in which a negative bias voltage of about 500 volts is applied to the rack and valve disks. The duration of the cleaning is approximately 5 minutes.

A layer of chromium having a thickness of about 20 nm is then deposited on the valve disks by sputtering. After the chromium adhesion layer is deposited, a strengthening layer of chromium nitride having a thickness of about 3 microns is deposited by reactive sputtering.

After the chromium nitride layer is deposited, the valve disks are disposed facing the arc source, and a top amorphous diamond layer having a thickness of about 300 nm is deposited by striking an arc on the carbon electrode and exposing the substrates to the carbon plasma exiting the source outlet. A negative DC bias of about 500 volts is initially applied to the substrates to provide high-energy ion bombardment for surface cleaning and bonding improvement. After about 5 minutes at high bias voltage, the bias voltage is reduced to about 50 volts for the remainder of the deposition process. An argon pressure of about 0.5 milliTorr is maintained in the chamber during deposition. Pulsed or AC bias voltages may alternatively be employed, and a higher or lower argon may also be maintained in order to stabilize the arc source operation and optimize coating properties.

It has been found by experiment that valve disks made of stainless steel and coated according to the above example were able to withstand more than 15,000 test cycles in circulating water carrying 20 micron silica sand, while standard uncoated alumina valve disks failed under the same conditions in less than 2500 cycles.

EXAMPLE 2

Clean zirconium valve disks are placed into an air oven, heated to a temperature of 560 C, held at this temperature for about 6 hours, and cooled. A strengthening layer of zirconium oxide is thereby formed on the substrate surface, having a thickness of 5–10 microns. The disks are then placed in a vacuum deposition chamber incorporating a filtered arc evaporation cathode and a sputtering cathode. An adhesion layer of chromium having a thickness of about 20 nm is deposited on the valve disks by sputtering as described in example 1. After the chromium adhesion layer is deposited, an amorphous diamond layer is deposited as described in Example 1.

Valve disks made of zirconium and treated as described to form a multilayer structure on their surfaces were tested for scratch resistance, using a scratch tester with variable loading. The scratch depths generated on the treated Zr disks by a stylus tip having 100 micron radius under a load of 3 Newtons were around 4.7 microns deep, while those on untreated Zr disks were about 9.5 microns or more than twice as deep. Scratch test performance is believed to be a relevant predictor of scratch and abrasion resistance in field applications.

EXAMPLE 3

Clean molded-glass valve disks are placed in a vacuum deposition chamber incorporating a laser ablation source, a PECVD source, and a sputtering cathode. The valve disks are subjected to a RF (radio-frequency) discharge plasma cleaning by known means. An adhesion layer of titanium having a thickness of about 20 nm is then deposited on the valve disks by sputtering. A strengthening layer of DLC having thickness of about 3 microns is then deposited on top of the adhesion layer by PECVD using known deposition parameters. An amorphous diamond layer having thickness of about 300 nm is then deposited on top of the DLC layer by laser ablation using typical deposition parameters.

EXAMPLE 4

Clean stainless steel valve disks are placed in a vacuum chamber containing a filtered arc evaporation source and a sputtering cathode. The chamber is evacuated, nitrogen gas is introduced, a plasma discharge is established between the disks and the chamber walls, and the disk surface is plasma-nitrided according to known parameters. Nitrogen diffuses into the stainless substrates to form a surface layer harder than the bulk substrate, and the process is continued for a period of time sufficient for the layer depth to reach about 2 microns. A superlattice consisting of multiple alternating layers of carbon nitride and zirconium nitride is then deposited on the nitrided stainless steel surface by filtered arc evaporation and sputtering respectively. The alternating individual layers are about 10 nm thick, and about 100 layers of each material is deposited for a total superlattice thickness of about 2 microns. The ratio of nitrogen to carbon in the carbon nitride layers is preferably around 1.3, since carbon nitride+zirconium nitride superlattices having this N:C ratio have been shown to have primarily sp3-bonded carbon and hardness in the range of 50 gigaPascals. Carbon nitride as used herein refers to a material having a N:C ratio between about 0.1 and 1.5.

The large number of thin layers may conveniently be deposited by mounting the substrate on a rotating cylinder such that the substrates pass first in front of one deposition source and then the other, such that one pair of layers is deposited during each revolution of the cylinder. The total strengthening layer thickness is about 4 microns including the plasma-nitrided stainless steel layer. An amorphous diamond layer having thickness of about 200 nm is then deposited on top of the superlattice layer by filtered arc evaporation as described in Example 1.

The construction and arrangement of the elements shown in the preferred and other exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, use of materials, etc.) without materially departing from the novel teachings and advantages of the subject matter recited herein. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present invention.

What is claimed is:

1. A method of forming a wear resistant component comprising:
    providing a base material;
    depositing a strengthening layer on the base material; and
    vapor depositing an amorphous diamond layer on the strengthening layer, the amorphous diamond layer having $sp^3$ bonding of at least about 40%, a hardness of at least about 45 GPa, and an elastic modulus of at least about 400 GPa.

2. The method as defined in claim 1 wherein the step of depositing a strengthening layer comprises depositing a plurality of superlattice layers.

3. The method as defined in claim 1 wherein the step of depositing a strengthening layer comprises alternately depositing a first chemical compound and then a second chemical compound.

4. The method as defined in claim 3 wherein the first chemical compound comprises a carbon nitride and the second chemical component comprises a metal nitride.

5. The method as defined in claim 1 further including the step of a co-depositing a graphitic phase with the amorphous diamond layer.

6. The method as defined in claim 1 wherein the amorphous diamond layer has a thickness less than about 10 microns.

7. The method as defined in claim 1 wherein the strengthening layer comprises at least one layer of chromium nitride.

8. The method as defined in claim 7 wherein the base material comprises a metal.

9. The method as defined in claim 8 wherein the metal is selected from the group consisting of stainless steel, aluminum, brass, titanium and zirconium.

10. The method as defined in claim 1 wherein the strengthening layer comprises a material selected from the group consisting of an oxide layer, a carbide layer, a carbo-nitride layer and a nitride layer.

11. The method as defined in claim 1 wherein the thickness of said strengthening layer is about 500 nm to 6 microns.

12. The method as defined in claim 1 wherein the amorphous diamond layer has a average surface roughness not substantially more than said strengthening layer.

13. The method as defined in claim 1 further comprising forming two of the wear resistant components to construct a valve component whereby each of the two components form a sealing surface to each other.

14. The method as defined in claim 1 wherein the step of depositing a strengthening layer comprises at least one of forming a plasma-nitrided layer and forming an ion implanted layer.

15. The method as defined in claim 1 wherein the base material is selected from the group consisting of a glass, a cermet, a glass containing material, a polymeric material and a composite material.

16. The method as defined in claim 1 wherein the step of depositing a strengthening layer comprises oxidizing a surface layer of the base material.

17. The method as defined in claim 1 wherein the amorphous diamond layer includes a plurality of ultra thin layers of different phases of diamond, at least one of which is amorphous diamond.

18. The method as defined in claim 1 wherein the amorphous diamond includes a dopant of at least one of nitrogen and a metal.

19. The method as defined in claim 1 further comprising depositing a transition layer between the strengthening layer and the amorphous diamond layer.

20. The method as defined in claim 19 wherein the transition layer comprises at least one of a carbo-nitride and a carbide.

21. The method as defined in claim 20 wherein the transition layer is formed by the step of introducing a carbon containing gas.

22. The method as defined in claim 1 further including the step of turning off any reactive gas at the end of depositing the strengthening layer, thereby forming a thin metal layer between the strengthening layer and the amorphous layer.

23. The method as defined in claim 1 wherein the step of depositing the amorphous layer includes filtered arc deposition of the amorphous layer and introducing a methane gas during the filtered arc deposition of the amorphous layer.

24. A method of producing a valve plate comprising:
providing a strengthening layer on a substrate; and
providing amorphous diamond on the strengthening layer;
wherein the amorphous diamond has sp$^3$ bonding of at least about 40%, a hardness substantially greater than that of diamond-like carbon, and an elastic modulus of at least about 400 GPa.

25. The method as defined in claim 24 wherein the amorphous diamond amorphous diamond has a hardness substantially greater than the strengthening layer.

26. The method as defined in claim 25 wherein the amorphous diamond has a hardness of at least about 45 GPa.

27. The method as defined in claim 24 wherein the amorphous diamond has a friction coefficient substantially lower than that of diamond-like carbon.

28. The method as defined in claim 24 wherein the step of providing amorphous diamond comprises depositing amorphous diamond at a temperature below approximately 250° C.

29. The method as defined in claim 24 wherein the step of providing a layer of amorphous diamond comprises vapor depositing the layer of amorphous diamond.

30. The method as defined in claim 24 wherein the substrate comprises at least one of a sintered ceramic and a metal.

31. The method as defined in claim 24 wherein the strengthening layer has a hardness greater than that of the substrate.

32. The method as defined in claim 24 wherein the strengthening layer comprises chromium nitride.

33. The method as defined in claim 24 wherein the strengthening layer comprises diamond-like carbon.

34. The method as defined in claim 24 wherein the thickness of the strengthening layer is between approximately 2000 nm and 5000 nm.

35. The method as defined in claim 24 further comprising providing an adhesion-promoting layer between the substrate and the strengthening layer.

36. The method as defined in claim 24 wherein the amorphous diamond includes a dopant of at least one of nitrogen and a metal.

37. The method as defined in claim 24 further comprising depositing a transition layer between the strengthening layer and the amorphous diamond layer.

38. The method as defined in claim 37 wherein the transition layer comprises at least one of a carbo-nitride and a carbide.

39. The method as defined in claim 38 wherein the transition layer is formed by the step of introducing a carbon containing gas.

40. The method as defined in claim 24 further comprising turning off any reactive gas at the end of depositing the strengthening layer, thereby forming a thin metal layer between the strengthening layer and the amorphous layer.

41. The method as defined in claim 24 wherein the step of depositing the amorphous layer includes filtered arc deposition of the amorphous layer and introducing a methane gas during the filtered arc deposition of the amorphous layer.

42. A method of forming a valve plate for a fluid control valve comprising:
providing a substrate for a valve plate of a fluid control valve;
depositing a strengthening layer on the substrate; and
utilizing a filtered arc deposition process to deposit an amorphous diamond layer on the strengthening layer at a temperature below approximately 250° C.;
wherein the amorphous diamond layer has sp$^3$ bonding of at least about 40%, a hardness of at least about 45 GPa, and an elastic modulus of at least about 400 GPa.

43. The method as defined in claim 42 wherein the strengthening layer comprises a plurality of superlattice layers.

44. The method as defined in claim 42 wherein the strengthening layer comprises chromium nitride.

45. The method as defined in claim 42 wherein the strengthening layer has a hardness greater than the substrate.

46. The method as defined in claim 42 further comprising providing a transition layer between the strengthening layer and the amorphous diamond layer, the transition layer comprising at least one material selected from the group consisting of a carbo-nitride material and a carbide material.

47. A method of forming a valve plate for a fluid control valve comprising:
providing a substrate to be utilized as a valve plate in a fluid control valve;
depositing a strengthening layer on the base material that is harder than the substrate at a thickness sufficient to increase the scratch resistance of the valve plate; and
vapor depositing an amorphous diamond material on the strengthening layer to a thickness of at least 100 nm, the amorphous diamond material having sp$^3$ bonding of at least about 40%, a hardness of at least about 45 GPa, an elastic modulus of at least about 400 GPa, and a coefficient of friction that is lower than that of diamond-like carbon,
wherein the amorphous diamond material is deposited at a lower temperature than is required for the deposition of polycrystalline diamond.

48. The method as defined in claim 47 wherein the amorphous diamond material is provided at a thickness of greater than 300 nm.

49. The method as defined in claim 47 wherein the amorphous diamond material is deposited at a temperature below approximately 250° C.

50. The method as defined in claim 47 further comprising providing a transition layer between the strengthening layer and the amorphous diamond material, the transition layer comprising at least one material selected from the group consisting of a carbo-nitride material and a carbide material.

51. A method of forming a component for use in a faucet comprising:
providing a valve plate comprising a base material;
depositing a strengthening layer on the base material, the strengthening layer having a hardness that is greater than that of the substrate; and
providing an amorphous diamond material on the strengthening layer, the amorphous diamond material consisting essentially of carbon and having a coefficient of friction that is lower than that of diamond-like carbon and a hardness that is higher than that of diamond-like carbon.

52. The method as defined in claim 51 wherein the amorphous diamond material has sp$^3$ bonding of at least about 40%, a hardness of at least about 45 GPa, and an elastic modulus of at least about 400 GPa.

53. The method as defined in claim 51 wherein the step of providing an amorphous diamond material comprises co-depositing a graphitic phase with the amorphous diamond layer.

54. The method as defined in claim 51 wherein the strengthening layer comprises at least one layer of chromium nitride.

* * * * *